Patented Jan. 15, 1946

2,392,841

UNITED STATES PATENT OFFICE 2,392,841

PREPARATION OF SULPHON CHLORIDES

Stanley R. Detrick, Wilmington, Del., and Lyle A. Hamilton, Pitman, N. J., assignors to E. I. du Pont de Nemours & Company, Wilmington, Del., a corporation of Delaware No Drawing. Application January 15, 1944, Serial No. 518,404

18 Claims. (Cl. 260—543)

This invention relates to the preparation of sulphon chlorides particularly in the presence of small proportions of iron.

It has been known to the art that organic compounds containing sulphur, oxygen and chlorine, particularly sulphon chlorides, can be obtained by reacting organic compounds with a mixture of sulphur dioxide and chlorine, employing light as a catalyst. This reaction is disclosed in Patent 2,046,090 and Re. 20,968 to Reed and is commonly known in the art as the Reed reaction. Since the issue of the patent to Reed, many proposals have been made for improving the reaction and particularly the yield therefrom and the control thereof. Many of such modifications have been described in patents, of which Patents 2,193,824 and 2,202,791 are illustrative. Furthermore, M. S. Kharasch, in his application Serial No. 291,515 filed August 23, 1939, discloses that he has found that sulphuryl chloride can be substituted for the mixture of sulphur dioxide and chlorine in such reaction.

It has been found that iron, present even in traces as ferric chloride, iron rust or metallic iron, acts as an anti-catalyst in the reaction, materially retarding the rate of the reaction and producing products of darker color and higher chlorine content that is desired. This effect of iron is recognized in Patent 2,202,791, wherein it is pointed out that the reaction vessel should not be constructed of materials, such as stainless steel, iron, aluminum, copper, copper alloys and the like.

This effect of iron is shown further by the following experiment: In a glass flask, 300 grams of a fully refined paraffin wax of 49° C. melting point was heated to 60° C. and to it was added 200 milligrams of ferric chloride. A mixture of approximately 70 grams per hour of chlorine and 100 grams per hour of sulphur dioxide was passed into the melted wax until it gained about two-thirds in weight. During this time, the reaction flask was illuminated with a 150-watt incandescent light and the temperature was kept at about 60° C. with external cooling. A portion of the sulphon chloride was hydrolyzed with a 50% aqueous solution of sodium hydroxide and a portion was analyzed for sulphur and chlorine, after removal of dissolved sulphur dioxide and chlorine by blowing with nitrogen for three hours.

The results are shown in the table below in comparison with a similar run made without any ferric chloride.

|  | Ferric chloride | No ferric chloride |
| --- | --- | --- |
| Time of reaction_____minutes__ | 360 | 144 |
| Weight of sulphon chloride____grams__ | 479 | 487 |
| Atomic ratio $\frac{Cl}{S}$ | 2.7 | 1.4 |
| Cl reacting to sulphon chloride per hour grams__ | 14 | 49 |
| Color of hydrolyzed product_____ | Very dark | Very light |

This shows that ferric chloride retards the reactions, causes an increase in the chlorination on the carbon chain and causes a much darker color of the sodium salt.

When it is attempted to carry out the reaction on a commercial scale, the reaction proceeds slowly and the products are dark colored and more highly chlorinated than desired, even though the reaction is carried out in a reaction vessel which does not contain iron or other objectionable metals. Applicants believe that the difficulty is due to the carrying of small amounts of iron into the reaction vessel from the gas lines which conduct the sulphur dioxide and chlorine to the reaction vessel. However, applicants do not wish to be limited to any theory as to the cause of the difficulty of carrying out this reaction on a commercial scale.

It is an object of the present invention to obtain a more efficient reaction and a better quality of product when producing sulphon chlorides on a commercial scale. Another object is to provide a method for more satisfactorily carrying out the reaction in the presence of iron. A further object is to provide a method for overcoming the anti-catalytic action of iron in this reaction. A still further object is to enable the carrying out of the Reed reaction in equipment made in whole or in part of iron or steel. Other objects are to advance the art. Still other objects will appear hereinafter.

The above and other objects may be accomplished in accordance with our invention by reacting sulphuryl chloride or a mixture of chlorine and sulphur dioxide with an organic compound devoid of phosphorus in the presence of a small proportion of an organic compound containing the radical of an acid of phosphorus. We have found that, when the reaction is carried out in the presence of an organic compound containing a radical of an acid of phosphorus, particularly on a commercial scale, the rate of the reaction is very materially increased and the products obtained are lighter in color and less highly chlorinated than when the reaction is carried out in the absence of such compound. We have particularly found that such compounds of the acids of phosphorus are very effective to overcome the anti-catalytic effect of iron to such an extent as to permit carrying out the reaction in equipment composed wholly or in part of steel or iron.

We have found that the organic compounds containing a radical of an acid of phosphorus are effective to improve the reaction when the reagent is either sulphuryl chloride or a mixture of chlorine and sulphur dioxide. Preferably, the sulphur dioxide and the chlorine are employed in the proportions and under the conditions described in Patents 2,193,824 and 2,202,791, although they may be further varied in the manner known to the art.

The starting materials, or organic compounds which are to be converted to sulphon chlorides, may be any of those proposed by Reed in his patents hereinbefore mentioned, or proposed by others skilled in the art as in the following patents: 2,174,492, 2,174,505, 2,174,506, 2,174,507, 2,174,508, 2,174,509, 2,193,824, 2,197,800, 2,202,791, 2,212,786, 2,263,312 and 2,321,022. The starting material should be devoid of phosphorus, in order to distinguish such starting material from the organic compound, containing a radical of an acid of phosphorus, which is added to improve the reaction. Preferably, the starting materials, to be converted to the sulphon chlorides, are saturated aliphatic compounds containing at least 8 carbon atoms. Such aliphatic compounds may be straight-chain or branched-chain acyclic compounds or cyclic aliphatic compounds. This invention is particularly concerned with the treatment of saturated aliphatic hydrocarbons of 8 or more carbon atoms and especially with the treatment of paraffin wax.

The organic phosphorus compounds, which are to be employed in accordance with our invention, may each be broadly defined as an organic compound which contains the radical of an acid of phosphorus. By the term "a radical of an acid of phosphorus," we mean the radical which may be derived by the removal of one or more hydrogens from an acid of phosphorus. Suitable compounds are those which may be represented by the formula

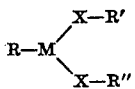

wherein R represents an aliphatic, aromatic, aliphatic oxy or aromatic oxy radical; R' represents hydrogen or an aliphatic or aromatic radical; R'' represents hydrogen or an aliphatic or aromatic radical; M represents P or the group P=X and X represents oxygen or sulphur.

The compounds within such formula are organic phosphonic acids, organic thiophosphonic acids, organic phosphinic acids, organic thiophosphinic acids and organic esters of phosphoric, thiophosphoric, phosphorous, thiophosphorous, phosphonic, thiophosphonic, phosphinic and thiophosphinic acids. Particularly satisfactory results have been obtained with the organic esters of the acids of phosphorus and particularly with the esters of orthophosphoric acid. Of such esters, we particularly prefer the aliphatic esters in which the aliphatic group contains at least 8 carbon atoms and especially wherein the aliphatic group is an acyclic hydrocarbon radical. Representative of the most desirable esters are the "Lorol" phosphates and particularly a mixture of mono- and di-"Lorol" phosphates. The "Lorol" phosphates are obtained by reacting "Lorol" alcohol with an esterifying derivative of an acid of phosphorus. "Lorol" alcohol is a mixture of alcohols of from 10 to 18 carbon atoms obtained by the fractionation of the mixture of alcohols resulting from the reduction of cocoanut or palm kernel oils.

Quite satisfactory results have also been obtained with the organic esters of phosphorous acids and particularly with the aliphatic phosphites such as tributyl phosphite. Particularly satisfactory results have also been obtained with the organic phosphinic acids and especially with the aryl phosphinic acids, such as benzene phosphinic acid.

The amounts of the organic phosphorus compounds, which should be employed, will depend largely on the amount of iron present and to some extent on the activity of the particular phosphorus compound and on other conditions. The phosphorus compounds of our invention are not equally effective under all conditions and the relative effectiveness of the different compounds will vary with variations in the conditions. It will generally be desirable to employ the phosphorus compound which is most soluble in the starting material and which will give the highest concentration of phosphorus acid radical. In general, the phosphorus compound will be employed in the proportion of from 0.1% to about 1% of the starting material, but as much as 5% may be employed. Larger amounts may be used in some cases, but will generally be undesirable as excessive amounts are wasteful, uneconomical and may constitute an undesirable contaminant in the final product.

Generally, the phosphorus compound will be added to and dissolved in the starting material. For this purpose, mutual solvents or blending agents may be employed for facilitating the solution or dispersion of the phosphorus compound in the starting material.

In order to more clearly illustrate our invention, the preferred modes of carrying the same into effect and the advantageous results to be obtained thereby, the following examples are given:

*Example 1*

In a glass flask, 300 grams of a fully refined paraffin wax of 123-125 A. M. P. (American melting point) was heated to 60° C., and to it were added 72 milligrams of ferric chloride and 600 milligrams of a mixture of mono- and di-"Lorol" phosphates (the "Lorol" radical being derived from commercial "Lorol" alcohol which is a mixture of alcohols containing from 10 to 18 carbon atoms). A mixture of chlorine and sulphur dioxide gases was then passed into the melted wax at the rate of approximately 100 grams per hour of chlorine and approximately 130 grams per hour of sulphur dioxide until the wax had gained about two-thirds of its original weight. During this time the reaction flask was illuminated with a 150-watt incandescent light and the temperature was kept at 60° C. by external cooling. A portion of the resulting sulphonchloride was hydrolyzed to the sodium salts of the corresponding sulphonic acids with a 50% aqueous solution of sodium hydroxide and a portion was analyzed for sulphur and chlorine. The results are shown in the table below in comparison with a similar run, made without the addition of the mixture of "Lorol" phosphates.

|  | "Lorol" phosphates | |
| --- | --- | --- |
|  | With | Without |
| Time of reaction_____hours__ | 2 | 3 |
| Weight of sulphon chloride_____grams__ | 493 | 504 |
| Atomic ratio $\frac{Cl}{S}$ | 1.39 | 1.74 |
| Cl reacting to sulphon chloride per hour__grams__ | 62 | 39 |
| Color of crude hydrolysis mass_____ | Light | Dark |

These results show that, in the presence of ferric chloride, "Lorol" phosphate causes an increase in the rate of reaction, a decrease in the chlorination on the carbon chain and a lighter color of the crude sodium sulphonate.

When the above comparison was repeated, using 2 grams of steel turnings instead of 72 mg. of ferric chloride, a similar improvement resulted from the addition of "Lorol" phosphate. Likewise, when the experiment was repeated, using 600 grams of carbon tetrachloride as a solvent for the wax and keeping the temperature at 25° C., qualitatively similar results were obtained.

*Example 2*

In a similar manner, 300 grams of cetane, containing 200 milligrams of ferric chloride and 600 milligrams of the mixed "Lorol" phosphates, was treated with sulphur dioxide and chlorine at 25° C. The following results were obtained in comparison with a similar run, made without the "Lorol" phosphates.

|  | "Lorol" phosphates | |
| --- | --- | --- |
|  | With | Without |
| Time of reaction_____minutes__ | 46 | 55 |
| Weight of sulphon chloride_____ | 390 | 392 |
| Atomic ratio $\frac{Cl}{S}$ | 1.37 | 1.32 |
| Cl reacting to sulphon chloride per hour grams__ | 75 | 68 |
| Color of sulphon chloride_____ | Colorless | Very dark |
| Color of crude hydrolysis mass_____ | Light | Darker |

*Example 3*

In a glass flask fitted with agitation and a reflux condenser, 300 grams of fully refined paraffin wax of 123–125 A. M. P. was heated to 60° C. and to it was added 1 gram stearamide, 200 milligrams ferric chloride and 600 milligrams of mixed "Lorol" phosphates. Then 435 grams of sulphuryl chloride was gradually added during about 2 hours. During this time, the flask was illuminated with an incandescent electric light and the heat of the reaction kept the temperature at 65° C. to 67° C. with a slight refluxing of sulphuryl chloride. At the end of the reaction, excess sulphuryl chloride was distilled out and the sulphon chloride was analyzed. The results, in comparison with a similar run without the "Lorol" phosphates, are as follows:

|  | "Lorol" phosphates | |
| --- | --- | --- |
|  | With | Without |
| Sulphur_____percent__ | 3.50 | 2.04 |
| Chlorine_____do____ | 17.94 | 12.96 |
| Atomic ratio $\frac{Cl}{S}$ | 4.6 | 5.4 |

It is, therefore, apparent that, in the presence of ferric chloride, the "Lorol" phosphate mixture caused a more efficient reaction to form sulphon chloride.

*Example 4*

When Example 1 was repeated, using 200 milligrams of ferric chloride (instead of 72 milligrams) and 600 milligrams of tributyl phosphite (instead of "Lorol" phosphate), the results were as follows:

|  | Tributyl phosphite | |
| --- | --- | --- |
|  | With | Without |
| Time of reaction_____minutes__ | 138 | 360 |
| Weight of sulphon chloride_____grams____ | 502 | 479 |
| Atomic ratio $\frac{Cl}{S}$ | 1.4 | 2.7 |
| Cl reacting to sulphon chloride per hour grams__ | 53 | 14 |
| Color of crude hydrolysis mass_____ | Light | Very dark |

*Example 5*

Example 4 was repeated, using benzene phosphinic acid in place of tributyl phosphite, with the following results:

|  | Benzene phosphinic acid | |
| --- | --- | --- |
|  | With | Without |
| Time of reaction_____minutes__ | 135 | 260 |
| Weight of sulphon chloride_____grams__ | 502 | 479 |
| Atomic ratio $\frac{Cl}{S}$ | 1.5 | 2.7 |
| Cl reacting to sulphon chloride per hour____ | 56 | 14 |
| Color of crude hydrolysis mass_____ | Light | Very dark |

*Example 6*

Example 1 was repeated, but, instead of 72 milligrams of ferric chloride, two test strips of cold rolled steel were placed in the flask. These test strips were approximately 25 x 12 x 3 millimeters in size and they weighed 7.4510 and 7.4760 grams respectively. The experiment was run several times in the same flask until the steel pieces had been exposed to the reaction for 68 hours. It was then found that one piece had lost 13 milligrams and the other 13.5 milligrams, which represents a penetration of 0.27 millimeters or 0.01 inch per year. The middle run of sulfon chloride, which is typical of the whole series, gave a weight of 500 grams in 125 minutes, having an atomic ratio of $$\frac{\text{sulphur}}{\text{chlorine}}$$

of 1.46. The weight of chlorine, reacting per hour to give sulphon chloride, was 56 grams and the hydrolyzed mass was tan colored. In the absence of the "Lorol" phosphate, the reaction was much retarded and the product was very dark in color.

*Example 7*

In a glass flask under illumination, 500 grams of fully refined paraffin wax, melting at 49° C. and containing 5 grams of the mixture of mono- and di-"Lorol" phosphates used in Example 1, was treated with a mixture of chlorine and sulphur dioxide gases at a rate of approximately 30 grams chlorine and 60 grams sulphur dioxide per hour for about 14 hours at 60° C. to 65° C. During this time, the reaction mixture was circulated, by means of a glass pump, through an external heat exchanger which included a steel pipe 46 cm. in length and 0.95 cm. internal diameter. After the completion of the reaction, the batch was allowed to remain in the apparatus for about 9 hours. It was then removed and another batch was run in the same way. This series of batch runs was continued until the iron pipe was exposed for 10 days to the combined corrosive action of the sulphur chloride and the dissolved chlorine, sulphur dioxide and hydrogen chloride. During the later runs of this series, the amount of "Lorol" phosphate in the wax was reduced from 1% to 0.5% and 0.25%, without any apparent effect on the efficiency of the reaction or the quality of the product. After the 10 days exposure, the steel pipe had lost 284 milligrams weight, which correspond to a penetration of 0.1 millimeter or 0.004 inch per year. Different samples of sulphur chloride, obtained in this series of runs, contained from 10 to 80 parts per million of iron. The highest amount found represents a penetration of 0.24 millimeters or 0.0095 inch per year. This experiment demonstrates that steel may be used in the construction of certain parts of the equipment used in the process when phosphorus compounds are employed in accordance with our invention.

The formulae of the organic phosphorus compounds, used in the examples, are:

Example 1:

Example 2: Same as Example 1.
Example 3: Same as Example 1.
Example 4:

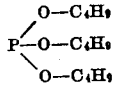

Example 5:

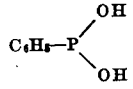

Example 6: Same as Example 1.
Example 7: Same as Example 1.

In addition to the organic compounds of phosphorus used in the above examples, others, which have been succesfully used, are benzene phosphonic acid, $C_6H_5$—$PO$—$(OH)_2$, diamyl benzene phosphonic acid, $C_6H_5$—$PO$—$(O$—$C_5H_{11})_2$ stearamido methane phosphonic acid, $$C_{17}H_{35}—CO—NH—CH_2—PO—(OH)_2$$

tri-"Lorol" phosphite $P$—$(OC_{12}H_{25})_3$, tri-"Lorol" thiophosphate $(C_{12}H_{25}O)_3P=S$ dicetyl phosphate $(C_{16}H_{33}O)_2 \cdot PO \cdot OH$, tri-"Lorol" phosphate $$O=P—(O \cdot C_{12}H_{25})_3$$

mono- and di-"Lorol" thiophosphate, $$C_{12}H_{25}O \cdot PS \cdot (SH)_2 \text{ and } (C_{12}H_{25}O)_2PS \cdot SH$$

tri-cresyl phosphate $(C_7H_8O)_3 \cdot P=O$, diphenyl phosphate $(C_6H_5O)_2 \cdot PO \cdot OH$ diamino phenyl phosphate $C_6H_5O \cdot PO \cdot (NH_2)_2$ and lecithin

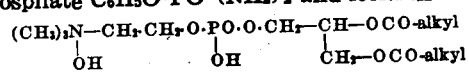

Phosphoric acid and mono sodium phosphate were also found to partly prevent the harmful effect of iron in the reaction of chlorine and sulphur dioxide on wax. However, they are less desirable to use for this purpose since they are not appreciably soluble in aliphatic oils and waxes and, therefore, they are not forced into contact with all iron surfaces and furthermore they leave an insoluble residue to be separated from the sulphon chloride.

It will be understood that the preceding examples are given for illustrative purposes solely and that our invention is not to be limited to the specific embodiments disclosed therein, but that many variations and modifications can be made in the phosphorus compounds, in the starting materials and in the conditions employed without departing from the spirit or scope of our invention. Accordingly, we intend to cover our invention broadly as in the appended claims.

It will be apparent that our invention is of substantial value in improving the commercial production of organic sulphon chlorides, particularly where the reacting materials may be contaminated with small amounts of iron. Our invention makes it possible to conduct the reaction in the presence of iron or steel without appreciable loss of efficiency of the reaction or quality of the product. Our invention makes it possible to design more economical and practical equipment since all or parts of the equipment may be made from steel instead of the more expensive and less common materials, such as nickel, nickel clad steel and Monel metal. More particularly, by our invention, we are able to obtain an important increase in the rate of reaction while obtaining a decrease in the chlorination and a lighter color in the final product.

We claim:

1. In the process of preparing sulphon chlorides by reacting a member of the group consisting of sulphuryl chloride and a mixture of chlorine and sulphur dioxide with organic compounds devoid of phosphorus, the improvement which comprises carrying out the reaction in the presence of a small proportion of a compound of the group consisting of organic phosphonic acids, organic thiophosphonic acids, organic phosphinic acids, organic thiophosphinic acids and organic esters of phosphoric, thiophosphoric, phosphorous, thiophosphorous, phosphonic, thiophosphonic, phosphinic and thiophosphinic acids.

2. In the process of preparing sulphon chlorides by reacting a member of the group consisting of sulphuryl chloride and a mixture of chlorine and sulphur dioxide with saturated aliphatic compounds containing at least 8 carbon atoms but devoid of phosphorus, the improvement which comprises carrying out the reaction in the presence of a small proportion of a compound of the group consisting of organic phosphonic acids, organic thiophosphonic acids, organic phosphinic acids, organic thiophosphinic acids and organic esters of phosphoric, thiophosphoric, phosphorous, thiophosphorous, phosphonic, thiophosphonic, phosphinic and thiophosphinic acids.

3. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of a compound of the group consisting of organic phosphonic acids, organic thiophosphonic acids, organic phosphinic acids, organic thiophosphinic acids and organic esters of phosphoric, thiophosphoric, phosphorous, thiophosphorous, phosphonic, thiophosphonic, phosphinic and thiophosphinic acids.

4. In the process of preparing sulphon chlorides by reacting a member of the group consisting of sulphuryl chloride and a mixture of chlorine and sulphur dioxide with paraffin wax, the improvement which comprises carrying out the reaction in the presence of a small proportion of a compound of the group consisting of organic phosphonic acids, organic thiophosphonic acids, organic phosphinic acids, organic thiophosphinic acids and organic esters of phosphoric, thiophosphoric, phosphorous, thiophosphorous, phosphonic, thiophosphonic, phosphinic and thiophosphinic acids.

5. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an organic ester of an acid of phosphorus.

6. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an organic ester of a phosphoric acid.

7. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an organic ester of ortho-phosphoric acid.

8. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an aliphatic ester of ortho-phosphoric acid in which the aliphatic group contains at least 8 carbon atoms.

9. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an aliphatic ester of ortho-phosphoric acid in which the aliphatic group is an acyclic hydrocarbon radical containing at least 8 carbon atoms.

10. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of a mixture of mono- and di-aliphatic esters of ortho-phosphoric acid in which each aliphatic group is an acyclic hydrocarbon radical containing at least 8 carbon atoms.

11. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of "Lorol" phosphates.

12. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of a mixture of mono- and di-"Lorol" phosphates.

13. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an organic ester of a phosphorous acid.

14. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an aliphatic ester of phosphorous acid.

15. In the process of preparing sulphon chlorides by reacting a member of the group consisting of sulfuryl chloride and a mixture of chlorine and sulfur dioxide with saturated aliphatic hydrocarbons containing at least 8 carbon atoms, the improvement which comprises carrying out the reaction in the presence of a small proportion of tributyl phosphite.

16. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an organic phosphinic acid.

17. In the process of preparing sulphon chlorides by reacting a member of the group consisting of sulphuryl chloride and a mixture of chlorine and sulphur dioxide with saturated aliphatic hydrocarbons containing at least 8 carbon atoms, the improvement which comprises carrying out the reaction in the presence of a small proportion of an aryl phosphinic acid.

18. In the process of preparing sulphon chlorides by reacting a member of the group consisting of sulphuryl chloride and a mixture of chlorine and sulfur dioxide with saturated aliphatic hydrocarbons containing at least 8 carbon atoms, the improvement which comprises carrying out the reaction in the presence of a small proportion of benzene phosphinic acid.

STANLEY R. DETRICK.
LYLE A. HAMILTON.

Certificate of Correction

Patent No. 2,392,841. January 15, 1946.

STANLEY R. DETRICK ET AL.

It is hereby certified that errors appear in the printed specification of the above numbered patent requiring correction as follows: Page 1, second column, lines 15–16, for "reactions" read *reaction*; page 2, second column, line 42, after "from" insert *about*; page 3, first column, line 21, in the table, first column thereof, for "hydrloysis" read *hydrolysis*; page 4, first column, lines 15 and 25, for "sulphur" read *sulfon*; same page, second column, lines 42, 55, and 69, page 5, first column, lines 8, 21, 30, 39, 49, 59, and 70, and second column, lines 8, 16, 24, 32, 49, 57, and 65, for "sulphuryl" read *sulfuryl*; same page 5, second column, line 10, for "a least" read *at least*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*